United States Patent
Quick et al.

(10) Patent No.: US 9,104,737 B2
(45) Date of Patent: Aug. 11, 2015

(54) SOCIAL DISTANCE BASED SEARCH RESULT ORDER ADJUSTMENT

(75) Inventors: David R. Quick, Bellevue, WA (US); Mohamed M. Battisha, Redmond, WA (US); Alexander E. Mallet, Seattle, WA (US); David A. Nichols, Redmond, WA (US); Michael Patrick Mroch, Bellevue, WA (US); Nikolay Smolyanskiy, Seattle, WA (US); Tevfik S. Ingec, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 12/575,749

(22) Filed: Oct. 8, 2009

(65) Prior Publication Data

US 2011/0087661 A1  Apr. 14, 2011

(51) Int. Cl.
*G06F 17/30* (2006.01)
(52) U.S. Cl.
CPC ............................... *G06F 17/30554* (2013.01)
(58) Field of Classification Search
CPC .................. G06F 17/30867; G06F 17/30554; G06Q 10/10; G06Q 50/01; G06Q 30/0603; G06Q 30/02; G06Q 30/2015; G06Q 30/0255; G06Q 30/0269; G06Q 30/0254; G06Q 30/0275; G06Q 10/02; G06Q 30/0601; G06Q 40/12; G06Q 10/00; G06Q 30/00; G06Q 30/0185
See application file for complete search history.

(56) References Cited

U.S. PATENT DOCUMENTS

| | | | |
|---|---|---|---|
| 7,933,904 B2 | 4/2011 | Nelson | |
| 2004/0148275 A1 | 7/2004 | Achlioptas | |
| 2005/0055341 A1 | 3/2005 | Haahr et al. | |
| 2006/0004892 A1 | 1/2006 | Lunt et al. | |
| 2006/0074863 A1 | 4/2006 | Kishore et al. | |
| 2007/0143283 A1 | 6/2007 | Spencer et al. | |
| 2007/0208751 A1 | 9/2007 | Cowan et al. | |
| 2008/0055049 A1 | 3/2008 | Weill et al. | |
| 2008/0059455 A1* | 3/2008 | Canoy et al. ..................... 707/5 |
| 2008/0091723 A1 | 4/2008 | Zuckerberg | |
| 2008/0140650 A1 | 6/2008 | Stackpole | |
| 2008/0183694 A1* | 7/2008 | Cane et al. ..................... 707/5 |
| 2008/0189122 A1* | 8/2008 | Coletrane et al. ............. 705/1 |

(Continued)

FOREIGN PATENT DOCUMENTS

| | | |
|---|---|---|
| CN | 102945269 | 2/2013 |
| CN | 102999560 | 3/2013 |
| KR | 20110019131 | 2/2011 |

OTHER PUBLICATIONS

"Introducing Google Social Search: I finally found my friend's New York blog!", http://googleblog.blogspot.com/2009/10/introducing-google-social-search-i.html, (Oct. 26, 2009),5 pages.

(Continued)

*Primary Examiner* — Dinku Gebresenbet
(74) *Attorney, Agent, or Firm* — Nicholas Chen; Kate Drakos; Micky Minhas

(57) ABSTRACT

Both search criteria and a friends list associated with a user are obtained. One or more data items that satisfy the search criteria are identified as search results. An order of the search results is adjusted based at least in part on multiple additional friends lists, each of which is associated with a data item of the one or more data items. Each of the multiple additional friends lists can also be updated to reflect changes in the friends lists made by users associated with the friends lists.

13 Claims, 5 Drawing Sheets

(56) References Cited

U.S. PATENT DOCUMENTS

| | | |
|---|---|---|
| 2008/0195601 A1 | 8/2008 | Ntoulas et al. |
| 2008/0301112 A1 | 12/2008 | Wu |
| 2009/0006388 A1 | 1/2009 | Ives et al. |
| 2009/0012841 A1 | 1/2009 | Saft et al. |
| 2009/0043789 A1 | 2/2009 | Gupta |
| 2009/0106307 A1 | 4/2009 | Spivack |
| 2009/0132516 A1* | 5/2009 | Patel et al. .......... 707/5 |
| 2009/0187537 A1* | 7/2009 | Yachin et al. .......... 707/3 |
| 2009/0192996 A1 | 7/2009 | Guo et al. |
| 2009/0254529 A1 | 10/2009 | Goldentouch |
| 2009/0319521 A1 | 12/2009 | Groeneveled et al. |
| 2010/0070488 A1 | 3/2010 | Sylvain |
| 2010/0082583 A1 | 4/2010 | Chang et al. |
| 2010/0145976 A1 | 6/2010 | Buergener et al. |
| 2010/0250578 A1 | 9/2010 | Athsani et al. |
| 2010/0262477 A1 | 10/2010 | Hillerbrand et al. |
| 2010/0277611 A1 | 11/2010 | Holt et al. |
| 2011/0055217 A1 | 3/2011 | Kamel et al. |
| 2011/0066954 A1 | 3/2011 | Zuber |
| 2011/0087693 A1 | 4/2011 | Boyce |
| 2011/0093460 A1 | 4/2011 | Lunt et al. |
| 2011/0153551 A1 | 6/2011 | Gabriel et al. |
| 2011/0231347 A1 | 9/2011 | Xu et al. |
| 2011/0231383 A1 | 9/2011 | Smyth et al. |
| 2013/0110802 A1 | 5/2013 | Shenoy et al. |
| 2013/0110827 A1 | 5/2013 | Nabar et al. |

OTHER PUBLICATIONS

Xu, et al., "Towards the Semantic Web: Collaborative Tag Suggestions", retrieved at <<http://citeseerx.ist.psu.edu/viewdoc/download?doi=10.1.1.97.4194&rep=rep1&type=pdf>>, pp. 8.

Kirchhoff, et al., "Using Social Network Analysis to Enhance Information Retrieval Systems", retrieved at <<http://www.alexandria.unisg.ch/EXPORT/DL/Matthes_Fleck/46828.pdf>>, pp. 21.

Kirsch, Sebastian Marius, "Social Information Retrieval", retrieved at <<http://citeseerx.ist.psu.edu/viewdoc/download?doi=10.1.1.87.6150&rep=rep1&type=pdf>>, Nov. 2, 2005, pp. 104.

Shepitsen, et al., "Personalized Recommendation in Social Tagging Systems Using Hierarchical Clustering", retrieved at <<http://maya.cs.depaul.edu/~mobasher/papers/recsys08_sgmb.pdf>>, Oct. 23-25, 2008, pp. 8.

"Google +1 Button, Social Sharing Similar to Facebook Like", http://www.ghacks.net/2011/03/30/google-1-button-social-sharing-similar-to-facebook-like/, Retrieved on Sep. 21, 2011,2 Pages.

Abel, Fabian et al., "Leveraging Multi-faceted Tagging to improve Search in Folksonomy Systems", *In Proceedings of the 21st ACM Conference on Hypertext and Hypermedia*, http://www.l3s.de/~abel/ht115-abel.pdf,(Jun. 2010),2 Pages.

Aiello, Luca et al., "Secure and Flexible Framework for Decentralized Social Network Services", *8th IEEE International Conferences on Pervasive Computing and Communications (PERCOM Workshops)*, (2010),6 Pages.

Amigo, et al., "WePS-3 Evaluation Campaign: Overview of the Online Reputation Management Task", http://clef2010.org/resources/proceedings/clef2010labs_submission_115.pdf, (2010),13 Pages.

Gotta, Mike "Trends in Social Software", http://qbx6.ltu.edu/vitrc/CoolTools/Trends%20in%20Social20%20Software.pdf, (May 15, 2006),44 pages.

Gou, Liang et al., "SNDocRank: a Social Network-Based Video Search Ranking Framework", *In Proceedings of the International Conference on Multimedia Information Retrieval*, (Mar. 2010),10 Pages.

Ono, Shingo et al., "Person Name Disambiguation in Web Pages Using Social Network, Compound Words and Latent Topics", *In Proceedings of the 12th Pacific-Asia Conference on Advances in Knowledge Discovery and Data Mining*, (May 2008),12 Pages.

"Non Final Office Action", U.S. Appl. No. 13/282,001, (Jul. 18, 2012), 13 Pages.

"Final Office Action", U.S. Appl. No. 13/282,001, (Nov. 28, 2012), 17 Pages.

"Non-Final Office Action", U.S. Appl. No. 13/282,001, (Sep. 23, 2013),15 pages.

"Final Office Action", U.S. Appl. No. 13/282,025, (May 7, 2013),16 Pages.

"Non-Final Office Action", U.S. Appl. No. 13/282,001, (Aug. 1, 2013),15 Pages.

"Non-Final Office Action", U.S. Appl. No. 13/282,025, (Sep. 27, 2012),15 Pages.

"Search Report and Written Opinion", Application No. PCT/US2012/062001, (Feb. 25, 2013), 9 Pages.

Zhang, et al., "Exploiting Tags and Social Profiles to Improve Focused Crawling", *2009 IEEE/WIC/ACM International Conference on Web Intelligence and Intelligent Agent Technology*, (2009), 4 Pages.

Zhang, et al., "Profile-Based Focused Crawling for Social Media-Sharing Websites", *Tools With Artificial Intelligence*, 2008. ICTAI '08. 20th IEEE International Conference., (2008),13 Pages.

"Final Office Action", U.S. Appl. No. 13/282,001, Dec. 30, 2013, 16 Pages.

"Search Report and Written Opinion", Application No. PCT/US2012/062003, (Feb. 28, 2013), 10 Pages.

\* cited by examiner

SOCIAL DISTANCE BASED SEARCH RESULT ORDER ADJUSTMENT

BACKGROUND

As computing technology has advanced and become increasingly widespread, the amount of digital data that is available to users has become very large. Although having large amounts of digital data available to a user has advantages, it is not without its problems. One such problem is the difficulty a user can face in trying to find a particular piece of data that he or she is looking for (e.g., a particular photo, a particular document, a friend, and so forth). The user can enter search terms describing the particular piece of data that he or she is looking for, but situations can arise where a large number of different pieces of data satisfy those search terms. The user then has to try to identify which of those large number of different pieces of data is the particular piece of data that he or she is looking for, which can lead to user frustration and annoyance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, both search criteria and a friends list associated with a user are obtained. One or more data items that satisfy the search criteria are identified as search results. An order of the search results is adjusted based at least in part on multiple additional friends lists, and each of the multiple additional friends lists is associated with a data item of the one or more data items.

In accordance with one or more aspects, an identifier of a data item associated with a user is received. A search document for the data item is generated, the search document including a friends list of the user. The search document is maintained in a data store to be available for subsequent searching of one or more data items including the data item. Additionally, when the friends list of the user is changed, the search document is updated to reflect the change to the friends list of the user.

BRIEF DESCRIPTION OF THE DRAWINGS

The same numbers are used throughout the drawings to reference like features.

DETAILED DESCRIPTION

Social distance based search result order adjustment is discussed herein. Data items in a data store each have an associated search document. These data items can be, for example, user profiles, photographs, videos, other data documents, and so forth. The search document includes both an access control list and a friends list. The access control list identifies users that can access the data item, and the friends list identifies users that have been identified as friends of the owner of the data item. A user (a searcher) can subsequently submit search requests to search through the data store for data items that match search criteria. Search results are identified that include those data items that the searcher is entitled to access (based on the access control lists) and that satisfy the search criteria. The ordering of data items in the search results is adjusted based on whether the searcher or friends in a friends list of the searcher are included in the friends lists of the data items in the search results. If a person included in the friends list of the searcher is also included in a friends list of a particular data item then that particular data item is moved higher in the search results; if the searcher is included in a friends list of a particular data item then that particular data item is moved even higher in the search results.

Figure 1:
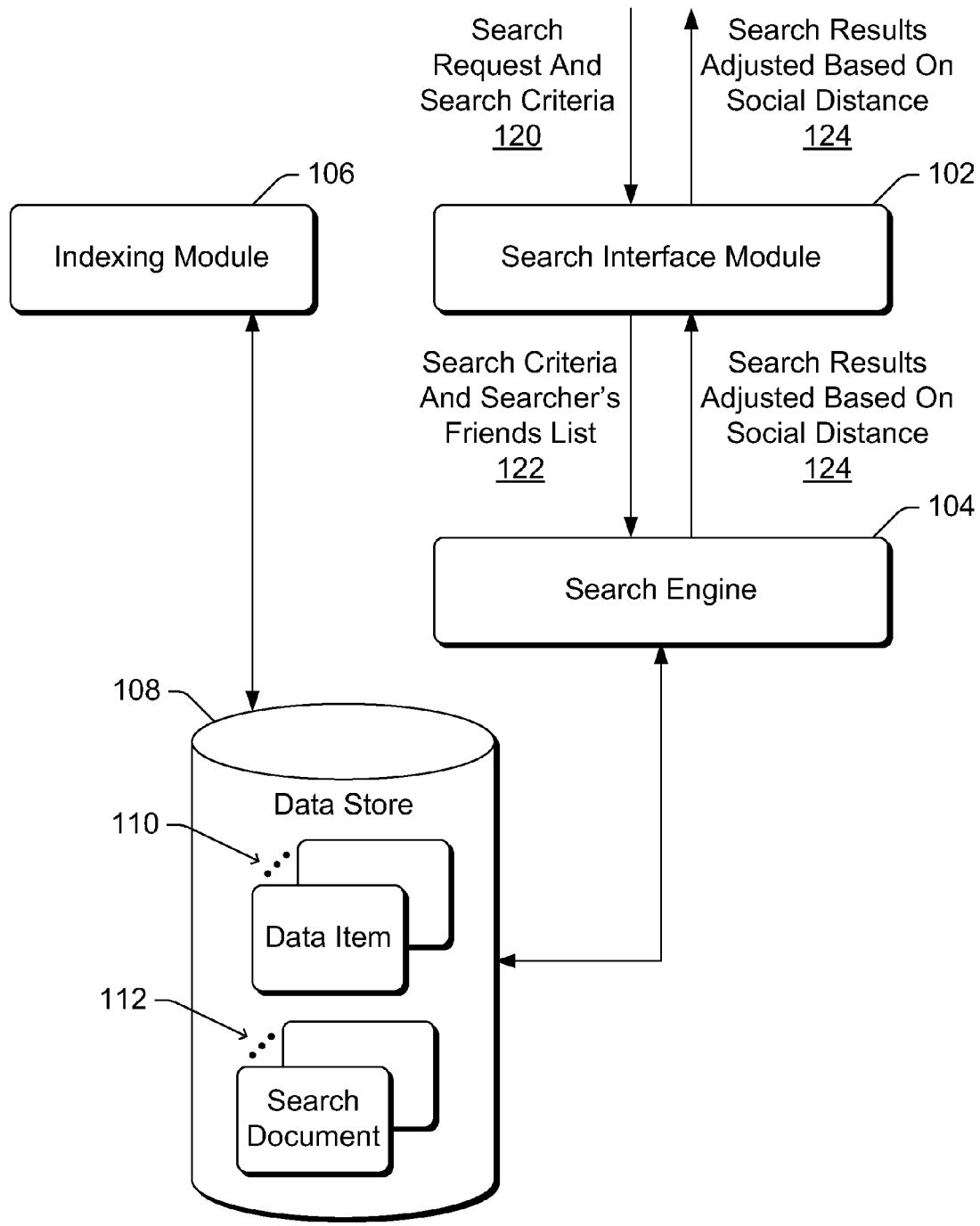
FIG. 1 illustrates an example system implementing the social distance based search result order adjustment in accordance with one or more embodiments.

FIG. 1 illustrates an example system 100 implementing the social distance based search result order adjustment in accordance with one or more embodiments. System 100 includes a search interface module 102, a search engine 104, an indexing module 106, and a data store 108. Each of module 102, engine 104, module 106, and data store 108 can be implemented on one or more computing devices. Alternatively, one or more of module 102, engine 104, module 106, and data store 108 can be implemented on the same computing device. The computing device or devices used to implement module 102, engine 104, module 106 and data store 108 can be a variety of different types of computing devices, such as server computers, desktop computers, laptop computers, and so forth. Additionally, the computing devices used to implement module 102, engine 104, module 106, and data store 108 can communicate with one another via a variety of different networks, including the Internet, a local area network (LAN), a public telephone network, an intranet, other public and/or proprietary networks, combinations thereof, and so forth.

Data store 108 stores multiple data items 110 and associated search documents 112. Data items 110 can be a variety of different types of data that can be stored and searched for, including user profiles, digital images, movies or other video content, songs or other audio content, data documents (e.g., word processing documents, spreadsheet documents), and so forth. Search documents 112 are used in the determination of search results and adjustment of the ordering of search results as discussed in more detail below.

Indexing module 106 manages the indexing of data items, which includes adding data items 110 and search documents 112 to data store 108. Particular data items and search documents can be added to data store 108 in response to input from a user and/or another module or device. Although illustrated as a separate module, it is to be appreciated that indexing module 106 can be separated into multiple modules, such as a user interface module and an indexing engine module.

Search interface module 102 provides a user interface for searching data store 108. This user interface includes allowing a user (or alternatively another module or device) to input a search request and search criteria. Each search request is associated with a particular user, such as the user entering the search request, the user logged into system 100 (or module 102) at the time the search request is entered, a user identified along with the search request, and so forth.

For each search request, search engine 104 receives the search criteria from search interface module 102 as well as additional information regarding the user associated with the search request. This additional information includes a friends list for the user, as discussed in more detail below. Search engine 104 identifies as the search results one or more data items 110 that satisfy the search criteria and that the user associated with the search request is allowed to access. The order of these search results is adjusted based on the search documents associated with the data items, and the adjusted search results are returned to search interface module 102. Search interface module 102, in turn, returns (e.g., displays or otherwise presents) the adjusted search results to the user (or other module or device) from which the search request was received.

In one or more embodiments, users interact with system 100 via one or more other devices (not shown). For example, a user can interact with system 100 via a computing device that displays user interfaces, receives user inputs, and communicates with system 100 via a variety of different networks, including the Internet, a local area network (LAN), a public telephone network, an intranet, other public and/or proprietary networks, combinations thereof, and so forth. Such a computing device can be a desktop computer, a mobile station, an entertainment appliance, a set-top box communicatively coupled to a display device, a cellular or other wireless phone, a game console, an automotive computer, and so forth. Alternatively, users can interact with system 100 directly, such as via user interfaces presented by search interface module 102 and/or indexing module 106.

System 100 is part of, or alternatively communicates with, a service that allows users to communicate with one another. An example of such a service is typically referred to as a social network service. Using the social network service, users are able to post messages or information for one another to view, share digital images or other documents, and so forth. Each user of system 100 has an associated user identifier (id) that identifies the user within the service. The user can log into the service with his or her credentials, which can take a variety of different forms (e.g., user id and password, smartcard, etc.). Once logged into the service, including his or her credentials being verified, the user is identified within the service using his or her user id.

The user of the service can also maintain a friends list. A particular user's friends list is a list of identifiers of other users of the service that that particular user has identified as being his or her friends (and optionally friends with higher degrees of separation as discussed below). Each user can decide for himself or herself which other users are to be added to his or her friends list. A user can identify his or her friends manually (e.g., by selecting them from a list, by entering identifiers of the friends, etc.) or the friends can be identified in an automated manner (e.g., users identified in his or her address book or contact list, users that are part of some group, etc.).

Additionally, in one or more embodiments a user's friends list includes identifiers of users with more than one degree of separation. The friends that a user has identified as being his or her friends are referred to as first-degree friends of the user, friends of a user's friends (users identified as being friends of any of the first-degree friends) are referred to as second-degree friends of the user, and so forth. Second-degree, third-degree, or higher-degree friends can be identified automatically by a list generation module or service (not shown) in a variety of different manners. For example, to identify the second-degree friends of a particular user, the friends lists of each of the particular user's first-degree friends can be accessed and each user identified on one of those friends lists is identified as a second-degree friend of the particular user. The user's friends list can optionally include an indication of which degree friend each friend in the friends list is. It is to be appreciated that overlaps on friends lists can occur, and such overlaps can be resolved by indicating a user is the lower-degree friend. For example, if a particular user identifies a user with identifier X as a friend, and if another user identified as a first-degree friend of the particular user also identifies the user with identifier X as a friend, then the user with identifier X is identified as a first-degree friend rather than a second-degree friend.

In situations where a user's friends list includes identifiers of users with more than one degree of separation, the users in the user's friends list are referred to as friends of the user. An indication of the degree of separation of particular friends in the friends list can be maintained as discussed above, but the users in the friends list of a particular user are still referred to as friends of that particular user regardless of the degree of separation.

Figure 2:
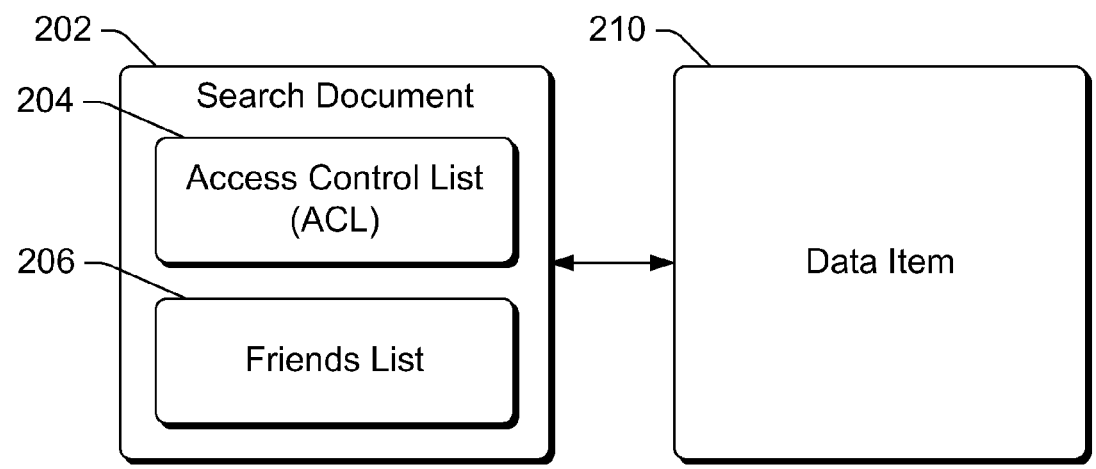
FIG. 2 is a block diagram illustrating an example search document in accordance with one or more embodiments.

Search documents include various information used to determine search results and/or adjust the ordering of search results. FIG. 2 is a block diagram illustrating an example search document in accordance with one or more embodiments. Search document 202 includes an access control list 204 and a friends list 206. A search document is associated with a particular data item in a data store (e.g., data store 108 of FIG. 1), illustrated as data item 210 in FIG. 2. Search document 202 can be, for example, a search document 112 of FIG. 1, and data item 210 can be, for example, a data item 110 of FIG. 1. In one or more embodiments, each data item in a data store has one associated search document, and each search document is associated with one data item. Alternatively, a single search document can be associated with multiple data items, and/or one or more data items in the data store may be associated with multiple data items.

Access control list (ACL) 204 and friends list 206 are determined based on the owner of data item 210. The owner of data item 210 refers to the user that is responsible for data item 210 in the data store. The owner of data item 210 is typically the user that adds data item 210 to the data store, but can alternatively be a different user. The owner of data item 210 can also be, but need not be, the author or creator of data item 210.

Access control list (ACL) 204 identifies one or more users that are allowed to access data item 210. ACL 204 can identify users in a variety of different manners. ACL 204 can identify users in a permissive manner, specifying one or more users that are allowed to access data item 210. Additionally or alternatively, ACL 204 can identify users in a restrictive manner, specifying one or more users that are not allowed to access data item 210. Users can be specified in ACL 204 in a variety of different manners, such as with specific user identifiers, group identifiers (identifying groups of multiple users), wildcard values (e.g., all users, users with identifiers or names matching a certain pattern), and so forth.

The particular ACL 204 for data item 210 can be identified in different manners. In one or more embodiments, the owner of data item 210 has a default ACL that is copied to search document 202 (e.g., by indexing module 106 of FIG. 1) when search document 202 is created. In other embodiments, a user interface is presented to the user allowing the user to specify users that are allowed to access data item 210. This user interface can be presented to the user (e.g., by indexing module 106 of FIG. 1) when search document 202 is created and/or after search document 202 is created (e.g., allowing the user to change which users are allowed to access data item 210).

Friends list 206 is a list of friends of the owner of data item 210. In one or more embodiments, when search document 202 is created the friends list of the owner of data item 210 is obtained and copied into search document 202 as friends list 206. The friends list is obtained from a module of a social network service that manages friends lists for users. Accordingly, data item 210 has associated with it a friends list that identifies the users identified by the owner of data item 210 as friends of the owner of data item 210.

Search document 202 can be associated with data item 210 in a variety of different manners. In one or more embodiments, data item 210 includes an identifier of search document 202, and/or search document 202 includes an identifier of data item 210. In other embodiments, data item 210 is included as part of search document 202, or search document 202 is included as part of data item 210.

In one or more embodiments, search document 202 is generated when data item 210 is added to the data store. Alternatively, search document 202 can be generated at other times. For example, search document 202 can be generated after data item 210 is added to the data store, or at the time data item 210 is generated (e.g., and the ACL 204 and friends list 206 subsequently updated when data item 210 is added to the data store).

Returning to FIG. 1, in one or more embodiments indexing module 106 adds data items to data store 108 in response to requests (received from a user or another module) to do so. Indexing module 106 generates a search document 112 for a particular data item 110 when the particular data item 110 is added to data store 108, and adds the generated search document 112 to data store 108 when the particular data item 110 is added to data store 108. Indexing module 106 also manages updates to search documents 112. A user of system 100 can change his or her friends list over time, adding new friends to the friends list and/or removing friends from the friends list. Additionally, a list generation module or service can change a friends list of a user over time (e.g., adding a new friend of a friend and/or removing a friend of a friend). Additionally, a user of system 100 can change the ACL associated with a particular data item 110, allowing additional users to access the particular data item 110 and/or prohibiting users from accessing the particular data item 110.

Indexing module 106 manages updates to search document 112 based on changes to the friends lists and/or ACLs. In one or more embodiments, indexing module 106 is notified of changes to a user's friends list. This notification can be received in a variety of different manners, such as from the module of a social network service that manages the friends lists, or directly from the user. In response to a change to a friends list of a user, indexing module 106 identifies each search document 112 that is associated with a data item 110 that is owned by that particular user. The owners of particular data items 110 can be identified in different manners, such as from a list or record mapping data items to owners, an indication of the owner included in the data items 110 or metadata associated with the data items 110, and so forth. Indexing module 106 updates the friends list in each identified search document 112 so that the friends list in each identified search document 112 is the same as the new (changed) friends list of the particular user. Indexing module 106 can update the friends lists in search documents 112 at different times, such as at particular intervals (e.g., once per day), or at other times (e.g., at the time the user makes the change to his or her friends list).

Additionally, in one or more embodiments indexing module 106 is notified of changes to the ACL of a particular data item. Module 106 can be notified of changes to the ACL of a particular data item in a variety of different manners, such as from a module of a social network service that manages access control lists, or directly from the user. In response to a particular user changing the ACL of a particular data item, indexing module 106 identifies the search document 112 associated with the particular data item. Indexing module 106 then updates the ACL in the identified search document to be the same as the new (changed) ACL for the particular data item. Indexing module 106 can update the ACLs in search documents 112 at different times, such as at particular intervals (e.g., once per day), or at other times (e.g., at the time a change to a friends list of a user is made).

When a user desires to search data store 108, a search request and search criteria 120 are provided to search interface module 102. The search request and search criteria 120 can be provided directly to module 102 (e.g., via a user interface presented to the user by module 102), or alternatively can be received via another module (e.g., via a user interface presented by a local module on a computing device being used by the user).

Search interface module 102 identifies the user from which the search request is received as the user associated with the search request (also referred to as the searcher). The user associated with the search request can be identified in different manners, such as being identified via an identifier of the user being input by the user and included along with the search request, being identified as the user that is logged into a particular service (e.g., a social network service) when the request is received, and so forth.

Search interface module 102 obtains a friends list of the user associated with the search request. Search interface module 102 can obtain this friends list in different manners, such as from a module of a social network service that the user is logged into, as part of the search request and search criteria 120, and so forth.

Search interface module 102 provides the search criteria and the friends list of the user associated with the search request 122 to search engine 104. Search engine 104 uses the received search criteria and friends list of the user associated with the search request 122 to identify as the search results one or more data items 110 that satisfy the search criteria, and to adjust the order of the search results.

In one or more embodiments, search engine 104 identifies the one or more data items 110 that satisfy the search criteria as those data items that have an ACL indicating the user associated with the search request is allowed to access the data item, and that also satisfy search terms received as part of the search criteria. These search terms can take different forms depending on the desires of the user associated with the search request, such as a particular name, a particular keyword, particular combinations of names and/or keywords, and so forth. These search terms can also use various wildcard values, such as a particular symbol to indicate one or more characters in a name or keyword. A data item 110 satisfies the search criteria if the search terms are included in the data item 110 or in metadata associated with the data item 110.

Alternatively, in one or more data items 110 need not have an associated ACL. For data items having no associated ACL, search engine 104 assumes that such data items can be accessed by all users.

Search engine 104 orders the search results according to one or more ordering criteria. The ordering criteria can result in particular data items being higher in the search results than other data items. Data items that are higher in the search results are also referred to as being towards the top or front of the search results, and are typically displayed or otherwise presented to the searcher before or more prominently than data items that are lower in the search results. The ordering criteria can be received by search engine 104 (e.g., from search interface module 102) or alternatively search engine 104 can be configured to include the ordering criteria. The ordering criteria can take a variety of different forms, and can be dependent on the type of data items 110 being searched.

In one or more embodiments, the ordering criteria are based on a comparison between the data items 110 (or metadata associated with the data items 110) and characteristics of the user associated with the search request. For example, if data items 110 are user profiles and the search criteria is a name of a person that the searcher is looking for, then the ordering criteria can be based on additional data included in a user profile of the searcher. This user profile of the searcher can be obtained from various sources, such as a module of a social network service that the searcher is logged into. A user profile can include various characteristics of a user, such as the user's birthplace, the user's interests, the user's hometown, the name of the college the user attended, years when the user attended that college, the name of the high school the user attended, the year the user graduated high school, and so forth. Search engine 104 can order the search results so that data items that have more characteristics in common with the user profile of the searcher are situated higher in the search results than data items that have fewer characteristics in common with the user profile.

The ordering criteria can also be based on other factors. For example, the ordering criteria can indicate that data items that have the search terms positioned closer to one another are to be higher in the search results than data items that have the search terms positioned further from one another. By way of another example, the ordering criteria can indicate that data items in which the search terms appear more frequently are to be higher in the search results than data items in which the search terms appear less frequently.

In addition to (or alternatively in place of) using the ordering criteria discussed above, the search results can be adjusted based on social distance. This social distance refers to the owners of data items being identified in a friends list of the searcher (or a friends list of a user identified in a friends list of the searcher).

The adjustment based on social distance includes changing the ordering of the search results based on, for each of one or more data items in the search results, whether the friends list in the search document associated with the data item includes the searcher and/or a person in the friends list of the searcher. In one or more embodiments, if a person included in the friends list of the searcher is also included in a friends list of a particular data item then that particular data item is moved higher in the search results, and if the searcher is included in a friends list of a particular data item then that particular data item is moved even higher in the search results.

In one or more embodiments, each data item in the search results is assigned a particular ranking value (also referred to as a weight). Data items with higher ranking values are higher in the search results than data items with lower ranking values. These ranking values can be assigned (or changed) based on the ordering criteria discussed above. Additionally, these ranking values are adjusted based on social distance. If the searcher is included in a friends list of a particular data item then the ranking value of that particular data item is increased by a first amount. If a person included in the friends list of the searcher is also included in a friends list of a particular data item then the ranking value of that particular data item is increased by a second amount (which is less than the first amount). Accordingly, data items that have a friends list that includes the searcher have their ranking values increased the most, and data items that have a friends list that includes a person that is also included in the friends list of the searcher (friends of friends) also have their ranking values increased (but increased by a lesser amount).

Additionally, in one or more embodiments the amount by which the ranking value of a particular data item is increased varies based on a degree of separation between the users, with lower degrees of separation resulting in ranking values being increased more than higher degrees of separation. For example, if the searcher is included as a first-degree friend in a friends list of a particular data item then the ranking value of that particular data item is increased by the first amount. However, if the searcher is included as a second-degree friend in a friends list of a particular data item then the ranking value of that particular data item is increased by a third amount (which can be less than, equal to, or greater than the second amount). And if a person included in the friends list of the searcher as a second-degree friend is also included in a friends list of a particular data item as a second-degree friend, then the ranking value of that particular data item is increased by a fourth amount (which can be less than, equal to, or greater than the third amount).

Furthermore, how many friends are common between an owner of a data item and the searcher can affect the adjustment of the ranking values. For example, a data item that has a friends list that includes one or more people that are also included in the friends list of the searcher has its ranking value increased by the second amount for each person that is included in (common to) both the friends list of the data item and the friends list of the searcher. Accordingly, data items with owners that have more friends in common with the searcher can have their ranking values increased by a larger amount than data items with owners that have fewer friends in common with the searcher.

Search engine 104 returns the search results as adjusted based on social distance 124 to search interface module 102. Search interface module 102, in turn, returns the search results as adjusted based on social distance 124 (received from search engine 104) to the searcher. The search results 124 can be returned directly to the searcher by module 102 (e.g., displayed or otherwise presented by module 102), or can be provided to another module or device for display or presentation to the searcher.

It is to be appreciated that data items 110 can have various associated metadata to assist in the searching process and/or ordering of search results. This metadata can include data that can be used to satisfy search terms (e.g., names of individuals included in a digital image, keywords included in a text document, and so forth). This metadata can also include data that can be used in conjunction with the ordering criteria discussed above for ordering the search results.

In one or more embodiments, in addition to the search results as adjusted based on social distance 124, search engine 104 returns additional information regarding the search results 124 to search interface module 102. This additional information can take a variety of different forms. One type of additional information that search engine 104 can return to search interface module 102 is an indication of how many friends owners of one or more of the data items 110 have in common with the searcher. This indication is obtained for a particular owner of a data item 110 by determining how many friends are included in both the friends list of the searcher and the friends list of the particular data item 110. Search interface module 102, in turn, can return this indication as well, thus allowing the searcher to see how many friends he or she has in common with the owners of particular data items 110. The degrees of separation indicated for those friends in the friends lists can also optionally be returned.

Another type of additional information that search engine 104 can return to search interface module 102 is identifiers of friends that owners of one or more of the data items 110 have in common with the searcher. This indication is obtained for a particular data item 110 by determining which friends are included in both the friends list of the searcher and the friends list of the particular data item 110. Search interface module 102, in turn, can return these identifiers as well, thus allowing the searcher to see which particular friends he or she has in common with the owners of particular data items 110. Search interface module 102 can also obtain (e.g., from another module of a social network service) user profiles of those identified friends and return information (e.g., names, pictures, contact information) of those friends for display to the searcher.

Another type of additional information that search engine 104 can return to search interface module 102 is an identifier of the owner of one or more data items 110. The owner of a data item 110 can be maintained in different locations, such as in the data item 110, in the search document 112 associated with the data item 110, in metadata associated with the data item 110, and so forth. Search engine 104 can additionally, or alternatively, return an indication of particular data items 110 in the search results for which the searcher is the owner.

Additionally, it should be noted that various values discussed herein can be monitored and changed over time. The successfulness of search results returned by search engine 104 can be monitored by search interface module 102 or alternatively another module or device. The successfulness of search results can be determined in different manners, such as based on how frequently the user selects one of the search results (e.g., clicks through), how frequently the user quits searching or enters different search criteria without selecting one of the search results, and so forth. Based on this monitoring, an administrator or user of system 100 can change the manner in which search engine 104 determines which data items 110 satisfy the search criteria, can change the ordering criteria used to order the search results, and/or can change the manner in which the search results are adjusted in an attempt to improve the successfulness of search engine 104. For example, based on this monitoring an administrator or user of system 100 can change the first amount and/or second amount by which ranking values of particular data items are increased.

Additionally, in one or more embodiments these changes can be performed automatically (e.g., by search engine 104 or another module or device). Such automatic changes can be performed in a variety of different manners. For example, search engine 104 can make a particular change, such as a change in which characteristics are used as a basis for the ordering criteria and/or a change in the first amount and/or second amount by which ranking values of particular data items are increased. A set of searches is then performed with these changes, while other searches are performed with the previous (unchanged) characteristics or amounts. The successfulness of search engine 104 with and without these changes is then compared, and if search engine 104 is more successful with these changes then search engine 104 makes the changes permanent. However, if search engine 104 is not more successful with these changes then search engine 104 can undo the changes and return to the previous (unchanged) characteristics or amounts.

Figure 3:
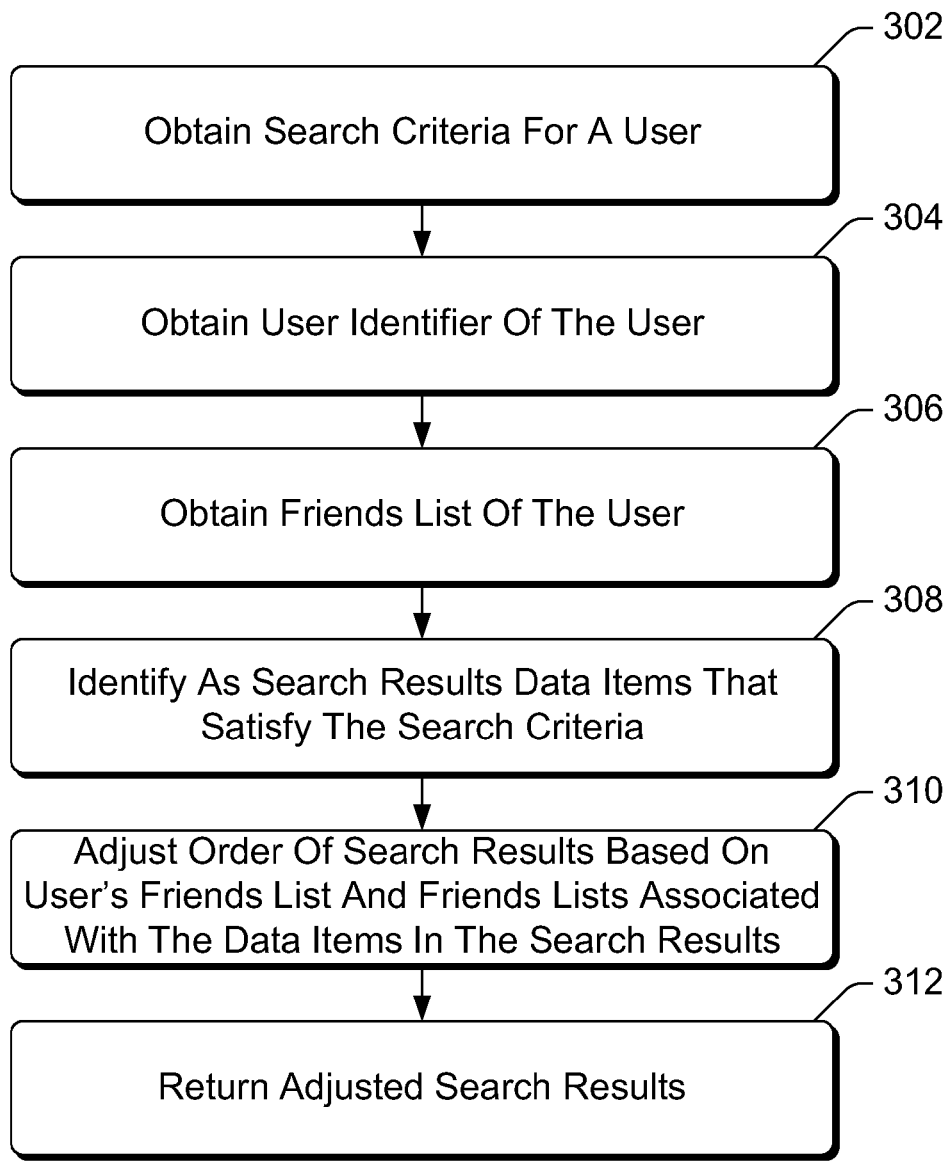
FIG. 3 is a flowchart illustrating an example process for implementing the social distance based search result order adjustment in accordance with one or more embodiments.

FIG. 3 is a flowchart illustrating an example process 300 for implementing the social distance based search result order adjustment in accordance with one or more embodiments. Process 300 is carried out by a system, such as system 100 of FIG. 1, and can be implemented in software, firmware, hardware, or combinations thereof. Process 300 is shown as a set of acts and is not limited to the order shown for performing the operations of the various acts. Process 300 is an example process for social distance based search result order adjustment; additional discussions of social distance based search result order adjustment are included herein with reference to different figures.

In process 300, search criteria for a user is obtained (act 302). This search criteria typically accompanies a search request, and can be obtained directly from the user or from another module or device.

A user identifier of the user is also obtained (act 304). This user is the user associated with the search request (the searcher).

A list friends list of the user is also obtained (act 306). This friends list is a list of other users of that the searcher has identified as being his or her friends (and optionally friends with higher degrees of separation), as discussed above.

Data items that satisfy the search criteria are identified as the search results (act 308). These data items can also be based on the access control lists for the data items, as discussed above. Alternatively, in one or more embodiments the data items need not have associated access control lists, in which case the data items are considered to be accessible to all users. In such embodiments, the data items in act 308 are not based on the access control lists for the data items. Additionally, the search results can optionally be ordered according to particular ordering criteria as discussed above.

The order of the search results is adjusted based on the user's friends list and the friends lists associated with the data items in the search results (act 310). As discussed above, the order of the search results can be adjusted so that if a person included in the friends list of the user is also included in a friends list of a particular data item then that particular data item is moved higher in the search results, and if the user is included in a friends list of a particular data item then that particular data item is moved even higher in the search results. The order of search results can also be adjusted based on a degree of separation between the users as discussed above.

The adjusted search results are returned (act 312) and can be displayed or otherwise presented to the user. Additional information, such as how many friends and/or which friends the owner of a particular data item has in common with the user can also be returned and displayed or otherwise presented to the user.

Figure 4:
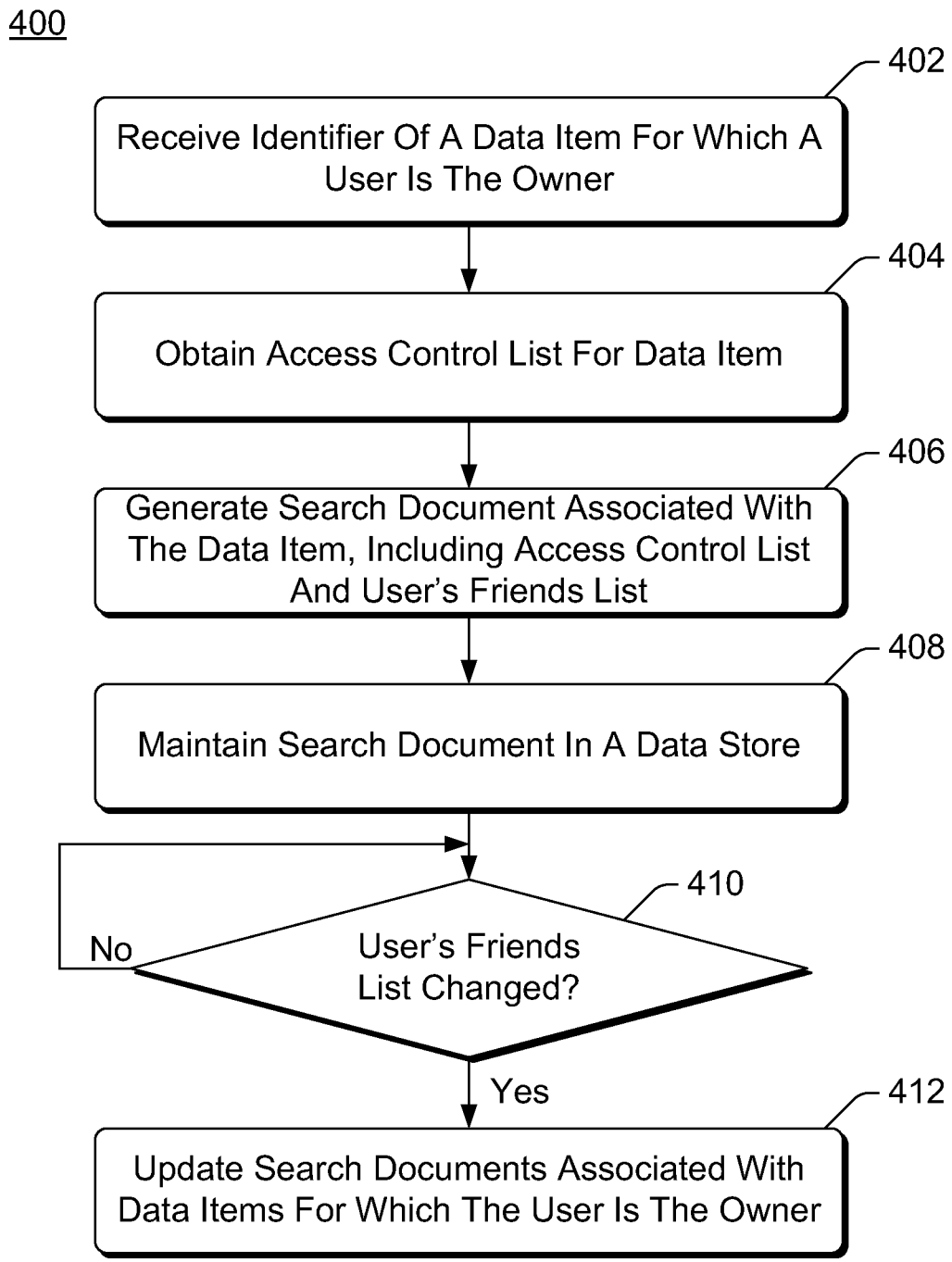
FIG. 4 is a flowchart illustrating an example process for generating and updating search documents in accordance with one or more embodiments.

FIG. 4 is a flowchart illustrating an example process 400 for generating and updating search documents in accordance with one or more embodiments. Process 400 is carried out by a system, such as system 100 of FIG. 1, and can be implemented in software, firmware, hardware, or combinations thereof. Process 400 is shown as a set of acts and is not limited to the order shown for performing the operations of the various acts. Process 400 is an example process for generating and updating search documents; additional discussions of generating and updating search documents are included herein with reference to different figures.

In process 400, an identifier of a data item for which a user the owner is received (act 402). This data item can be a variety of different types of data, as discussed above. The identifier of the data item can be received from a user, or alternatively from another module or device.

An access control list for the data item is obtained (act 404). This access control list can be obtained from the user or another module or device as discussed above.

A search document associated with the data item is generated (act 406). The search document includes the access control list obtained in act 404 as well as a friends list of the user.

The friends list can be obtained from a different system or device, or can be known by the system implementing process 400.

The search document is maintained in a data store (act 408). The search document can be associated with the data item identified in act 402 in a variety of different manners as discussed above.

Process 400 then proceeds based on whether the user's friends list is changed (act 410). If the user's friends list is changed, then the search documents associated with data items for which the user is the owner are updated (act 412). This updating reflects the changes that were made to the user's friends list.

However, if the user's friends list has not changed, then process 410 does not update the search documents in act 412 until the user's friends list has changed. Process 400 can be notified of changes and update the search documents in act 412 at particular intervals or when the change is made, as discussed above.

It is to be appreciated that the social distance based search result order adjustment techniques discussed herein support a variety of different usage scenarios. For example, returning to FIG. 1, data items 110 can be user profiles in a social network service, and the search request and search criteria 120 can be a request to search for a particular user by name. Search engine 104 identifies user profiles that satisfy the search criteria, and adjusts the search results so that user profiles having an associated friends list that includes a friend that is also included in the friends list of the searcher are moved higher in the search results. User profiles having an associated friends list that includes the searcher are moved even higher in the search results. Identifiers of particular friends that are included in both the friends lists of the user profiles in the search results and the friends list of the searcher can also be returned and identified to the searcher.

By way of another example, data items 110 can be photographs (digital images) and metadata associated with the photographs can identify users that are in the photographs. The search request and search criteria 120 can be a request to search for photographs that include particular users. Search engine 104 identifies photographs that satisfy the search criteria (based on the metadata of the photographs), and adjusts the search results so that photographs having an associated friends list that includes a friend that is also included in the friends list of the searcher are moved higher in the search results. Photographs having an associated friends list that includes the searcher are moved even higher in the search results. Identifiers of particular friends that are included in both the friends lists of the photographs in the search results and the friends list of the searcher can also be returned and identified to the searcher.

Figure 5:
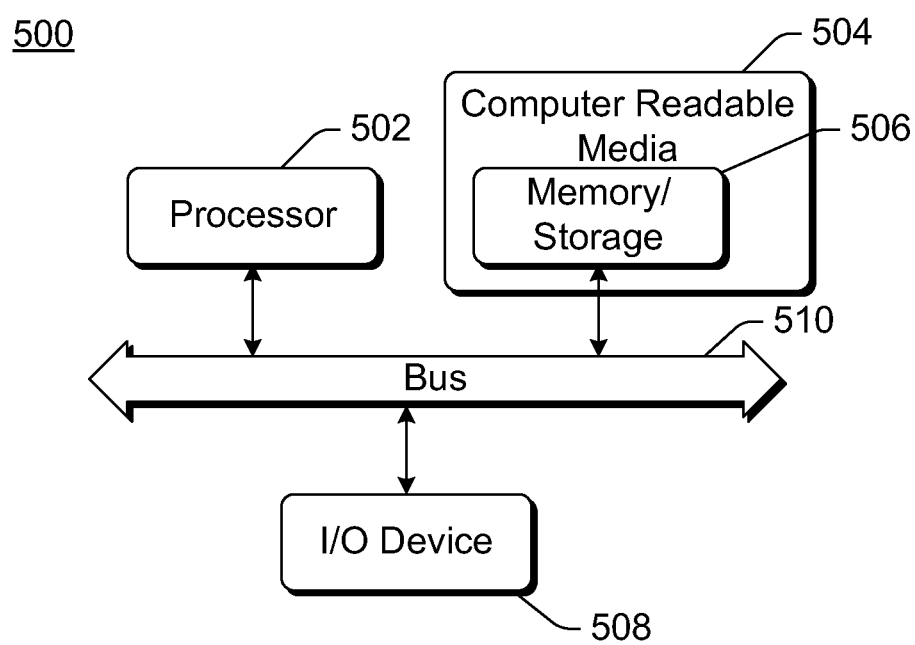
FIG. 5 illustrates an example computing device that can be configured to implement the social distance based search result order adjustment in accordance with one or more embodiments.

FIG. 5 illustrates an example computing device 500 that can be configured to implement the social distance based search result order adjustment in accordance with one or more embodiments. Computing device 500 can implement the techniques discussed herein, and can implement, for example, a search interface module 102, a search engine 104, an indexing module 106, and/or a data store 108 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or nonvolatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the social distance based search result order adjustment techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more processors; and
one or more memories comprising instructions stored thereon that, responsive to execution by the one or more processors, perform operations comprising:
obtaining search criteria associated with a searcher;
obtaining a friends list of the searcher;
identifying as search results data items that satisfy the search criteria, the data items each associated with a respective user; and
determining whether the searcher is listed in an additional friends list of the respective user associated with the data item;
determining friends listed in both the friends list of the searcher and the additional friends list of the respective user associated with the data item;
adjusting an order of the search results based on a ranking value generated for each of the data items by;
increasing the ranking value by a first amount in response to determining that the searcher is listed in the additional friends list associated with the respective user associated with the data item; and
increasing the ranking value by a second amount for each friend that is listed in both the friends list of the searcher and the additional friends list of the respective user associated with the data item, the first amount greater than the second amount; and
returning the search results for display in the adjusted order.

2. The system as recited in claim 1, wherein the instructions, responsive to execution by the one or more processor, perform operations further comprising ordering, prior to adjusting the order of the search results, the search results based on ordering criteria.

3. The system recited in claim 1, wherein the data items are data items in a data store that both satisfy the search criteria and that have an associated access control list that indicates the data item can be accessed by the searcher.

4. The system as recited in claim 3, wherein each of the data items has an associated search document that includes both the access control list for the data item and the additional friends list associated with the user associated with the data item.

5. The system as recited in claim 1, wherein the instructions, responsive to execution by the one or more processor, perform operations further comprising, for a first data item of the data items returning an indication of how many friends are listed in both the friends list of the searcher and the additional friends list of the respective user associated with the first data item.

6. The system as recited in claim 1, wherein the instructions, responsive to execution by the one or more processor, perform operations further comprising for a first data item of the data items returning identifiers of friends that are listed in both the friends list of the searcher and the additional friends list of the respective user associated with the first data item.

7. The system as recited in claim 1, wherein the search criteria comprises at least a portion of a name and the data items comprise one or more user profiles of respective users associated with the data items.

8. The system as recited in claim 1, wherein the instructions, responsive to execution by the one or more processor, perform operations further comprising, for a first data item of the data items, returning an indication of whether the user is an owner of the first data item.

9. A method comprising:
receiving, in a system, an identifier of a data item associated with a user;
generating a search document associated with the data item, the search document including both a friends list of the user that identifies friends of the user and an access control list for the data item that identifies one or more users that are allowed to access the data item;
maintaining the search document in a data store to be available for subsequent searching of data items including the data item;
updating, when the friends list of the user is changed, the search document to reflect the change to the friends list of the user;
obtaining search criteria associated with a searcher;
obtaining an additional friends list of the searcher;
identifying as search results data items that satisfy the search criteria, the data items including the data item;
determining whether the searcher is listed in the friends list of the user; determining friends listed in both the additional friends list of the searcher and the friends list of the user;
adjusting a position of the data item in the search results based on a ranking value associated with the data item, the ranking value generated by" increasing the ranking value by a first amount in response to determining that the searcher is listed in the friends list of the user; and
increasing the ranking value by a second amount for each friend that is listed in both the additional friends list of the searcher and the friends list of the user the first amount greater than the second amount, returning the search results for display in the adjusted order.

10. A method as recited in claim 9, wherein the data item comprises a user profile of the user.

11. A method as recited in claim 9, wherein the friends list comprises a list of identifiers of other users that the user has identified as being friends of the user.

12. A method as recited in claim 9, further comprising storing the data item in the search document.

13. One or more computer storage media having stored thereon multiple instructions that, when executed by one or more processors of a computing device, cause the one or more processors to:

obtain search criteria associated with a searcher, the search criteria comprising at least a portion of a name of another person;

obtain a user identifier of the searcher;

obtain a friends list of the searcher;

identify as search results one or more user profiles that both satisfy the search criteria and that have an associated access control list indicating the user profile can be accessed by the searcher; and adjust an order of the search results based at least in part on the friends list of the searcher and a set of friends lists, wherein each friends list in the set of friends lists is associated with a user profile of the one or more user profiles, and wherein to adjust the order is to:

assign a ranking value to each of the one or more user profiles, wherein the order of the search results is from a highest ranking value to a lowest ranking value, for each of the one or more user profiles, increase the ranking value of the user profile by a first amount in response to determining that the user identifier of the searcher is included in the friends list associated with the user profile, and for each of the one or more user profiles, increase the ranking value of the user profile by a second amount for each identifier of a friend that is included in the friends list of the searcher and also included in the friends list associated with the user profile, and wherein the first amount is greater than the second amount; and returning the search results for display in the adjusted order.

* * * * *